United States Patent
Yao

(10) Patent No.: US 10,902,580 B2
(45) Date of Patent: Jan. 26, 2021

(54) AUTO-DIMENSIONING REVIT MODELS

(71) Applicant: Applied Software Technology, Inc., Atlanta, GA (US)

(72) Inventor: Xiao Chun Yao, Marietta, GA (US)

(73) Assignee: Applied Software Technology, Inc., Atlanta, GA (US)

( * ) Notice: Subject to any disclaimer, the term of this patent is extended or adjusted under 35 U.S.C. 154(b) by 0 days.

(21) Appl. No.: 16/853,332

(22) Filed: Apr. 20, 2020

(65) Prior Publication Data
US 2020/0334808 A1    Oct. 22, 2020

Related U.S. Application Data

(60) Provisional application No. 62/835,665, filed on Apr. 18, 2019.

(51) Int. Cl.
*G06T 7/00* (2017.01)
*G06T 11/60* (2006.01)

(52) U.S. Cl.
CPC ............ *G06T 7/0006* (2013.01); *G06T 11/60* (2013.01); *G06T 2200/24* (2013.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 7,039,569 B1* | 5/2006 | Haws | | G06F 30/13 |
| | | | | 703/7 |
| 7,856,342 B1* | 12/2010 | Kfouri | | G06F 30/00 |
| | | | | 703/1 |
| 8,762,877 B2* | 6/2014 | Loberg | | G06F 30/13 |
| | | | | 715/775 |
| 9,262,863 B2* | 2/2016 | Yadav | | G06F 30/17 |
| 10,325,035 B2* | 6/2019 | Kelly | | G06T 19/00 |
| 2008/0275674 A1* | 11/2008 | Reghetti | | G06F 30/13 |
| | | | | 703/1 |
| 2010/0318929 A1* | 12/2010 | Hilton | | G06F 3/0481 |
| | | | | 715/769 |
| 2014/0164072 A1 | 6/2014 | Kulusjarvi | | |
| 2015/0029181 A1* | 1/2015 | Lerey | | G06F 30/18 |
| | | | | 345/419 |

(Continued)

OTHER PUBLICATIONS

Autodesk Revit 2015 Getting Started Guide.

(Continued)

*Primary Examiner* — Ryan M Gray
(74) *Attorney, Agent, or Firm* — Clayton, McKay & Bailey, PC

(57) ABSTRACT

Examples can include a system for auto-dimensioning part assemblies in REVIT or other software. A plugin can receive an identifier of a part assembly that is displayed on a graphical user interface ("GUI"). The plugin can determine a dimensioning rule based on the part identifier and dynamically select first and second reference points based on the dimensioning rule. Based on these rules, the plugin can calculate a dimension represented by the first and second reference points. This can include measuring a distance different than the distance between the first and second reference points. Then, the system can display the dimension outside a boundary of the part assembly.

17 Claims, 6 Drawing Sheets

(56) References Cited

U.S. PATENT DOCUMENTS

| | | |
|---|---|---|
| 2015/0135793 A1 | 5/2015 | Plummer |
| 2015/0142157 A1 | 5/2015 | Daugherty |
| 2018/0247002 A1* | 8/2018 | Mendez .................. G06F 30/00 |
| 2019/0042669 A1 | 2/2019 | De Backer |
| 2019/0370419 A1* | 12/2019 | Ronson ............... G06F 3/04815 |

OTHER PUBLICATIONS

Revit Architecture User's Guide, 2011.
Victaulic Tools for Revit, Revit 2014, 2015 and 2016.
Agapaki, Eva, et al., "Prioritizing object types for modelling existing industrial facilities", Automation in Construction 96 (2018): 211-223.
Li, Xiaodan, et al., "Modular and Offsite Construction of Piping: Current Barriers and Route", Applied Sciences 7.6 (2017): 547.
Son, Hyojoo, et al., "As-built data acquisition and its use in production monitoring and automated layout of civil infrastructure: A survey.", Advanced Engineering Informatics 29.2 (2015): 172-183.

\* cited by examiner

AUTO-DIMENSIONING REVIT MODELS

CROSS-REFERENCE TO RELATED APPLICATION

This application claims the benefit of and priority to U.S. Provisional Application No. 62/835,665, filed on Apr. 18, 2019, titled "AUTO-DIMENSIONING REVIT MODELS," the contents of which are hereby incorporated herein by reference in their entirety.

BACKGROUND

Computer-aided design ("CAD") software allows users to design structures for construction, among other things. One type of CAD software is Building Information Modeling ("BIM") software, which allows users to elaborately design three-dimensional structures. AUTODESK REVIT is one type of BIM software that can be used to design complex buildings all the way down to components and assemblies for use in a project. For example, a user can model an entire plumbing or electrical installation within a building.

REVIT provides functionality for manually measuring dimensions. However, to display the measurements of one or more parts, the user must manually measure each one. For example, the user can select a ruler tool and place two points and get a measurement between those points. However, REVIT does not include functionality for determining what the two points should be for particular part types. It is up to the user to make this determination. Because various Part dimensioning can be important for ordering the correct parts for use in any sort of construction project. For example, even if a user designs a layout of parts within REVIT, the user will not know which size parts to order based on REVIT. Even worse, the user may trust REVIT's measurements between two points that do not reflect the actual measurement points for a particular part type.

It is also very difficult to reliably measure parts in REVIT manually. The user may not know the correct start and end points for measuring a particular part. Even if they did, requiring manual ruler placement for each part in a design would be both a huge waste of time and prone to inaccuracies and mistakes.

For at least these reasons, a need exists for systems that can auto-dimension REVIT models.

SUMMARY

The examples described herein specifically address technical problems and limitations of REVIT and similar BIM software. The examples include a computing device, such as a personal computer, tablet, or laptop, that executes a computer-aided design application such as REVIT. The application can include an application programming interface ("API") that interacts with a plugin that supplies additional functionality for auto-dimensioning. The plugin can include a dimensioning engine that executes on the computing device.

In one example, the dimensioning engine can receive an identifier of a part assembly that is displayed on a graphical user interface ("GUI") of the computing device. The identifier can be a custom identifier for a part or part type that relates to one or more part assemblies. A part assembly can be one or more parts that are presented together as an assembled unit in the application.

The plugin (such as the dimensioning engine) can determine a dimensioning rule based on the part identifier. This can include looking up dimensioning rules in one or more tables using the part identifier. The dimensioning rules can vary based on what types of parts are attached to one other, how the attachment occurs, angles of intersection, and other part-specific information. The rules can indicate which portions of the part assembly need to be measured for dimensioning purposes. There can be several measurements that take place in order to determine the same or fewer number of dimensions. The dimensioning rules can also specify which of these dimensions to show, and which ones should remain hidden.

The dimensioning engine can dynamically select first and second reference points based on the dimensioning rule. The first and second reference points can be used to calculate a dimension even though the dimension itself may be different than a measurement between those reference points. For example, the dimensioning engine can calculate a dimension represented by the first and second reference points. This can include additional measurements other than just measuring in a line between the first and second reference points. For example, when the first reference point is on a first part of a tee and the second reference point is on a second part of the tee, the dimensioning engine can pick a third point that forms lines parallel with the first and second parts based on the first and second reference points. A measurement from the first or second reference point to the third point can be used as the dimension of the first and second reference points.

Then, the computing device can display, on the GUI, the dimension outside a boundary of the part assembly. This can include displaying the dimension as one of multiple dimensions. It can be displayed in a working window of the GUI where the part assembly is being laid out in a construction plan. Alternatively, the GUI can present a window with multiple views of the part assembly with dimensions hidden or shown based on the view of the part assembly. These various views can be dragged into another screen, such as an ordering screen for use in ordering parts having certain dimensions.

The method can be performed by a system in an example. The method can also be implemented based on code stored on a non-transitory, computer-readable medium, which is read and executed by a process of a computing device.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples can include a system for auto-dimensioning part assemblies in existing BIM software, such as REVIT. A plugin can interact with the BIM software to provide dimensioning functionality. In one example, the plugin receives an identifier of a part assembly that is displayed on a graphical user interface ("GUI"). The plugin can determine a dimensioning rule based on the part identifier and dynamically select first and second reference points based on the dimensioning rule. Based on these rules, the plugin can calculate a dimension represented by the first and second reference points. This can include measuring a distance different than the distance between the first and second reference points. For example, the plugin can measure along a projection line that is parallel to a portion of the part identifier.

Then, the system can display the dimension outside a boundary of the part assembly. The plugin can cause the BIM software to draw a ruler, for example, within a GUI. The rule can be oriented in a visible location that is not blocked by the part, in an example. The ruler can include the measurement based on the dimensioning rule.

Figure 1:
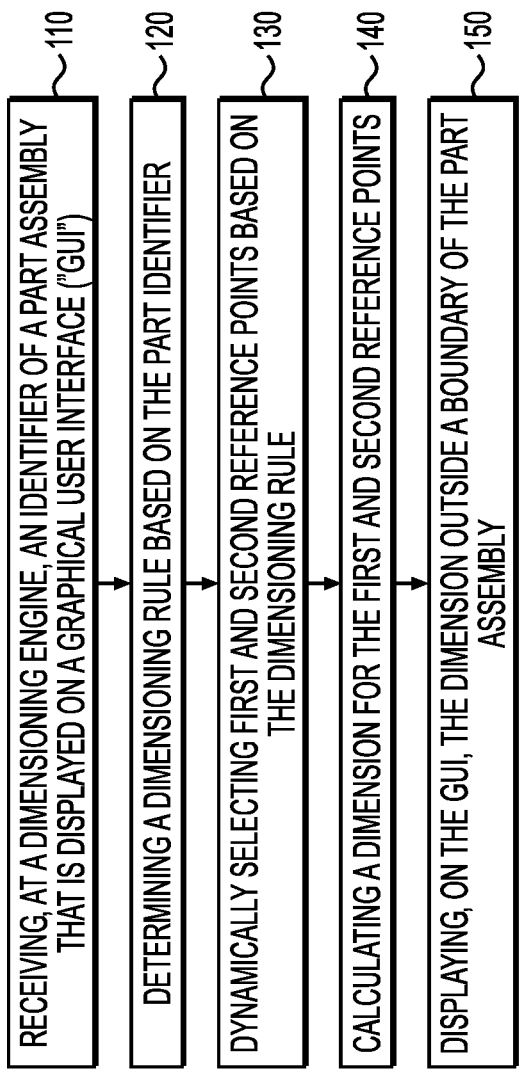
FIG. 1 is an example flow chart showing example stages for auto-dimensioning a part assembly in a computer-aided design application, such as REVIT.

FIG. 1 is an example illustration of method stages performed in an example. At stage 110, the plugin can receive an identifier of a part assembly. The part assembly can be selected in REVIT, such as by selecting a new part for use within the design layout screen. In one example, the plugin begins the auto-dimensioning when the part assembly is dragged into a screen in REVIT, such as a screen for laying out components or a screen for generating a parts list. Alternatively, the part assembly can be selected and the user can then hit a button for performing the auto-dimensioning. REVIT can send the identifier to the plugin using API calls for back-and-forth communications between the main application and the plugin. The part assembly can be displayed on the GUI before or after selection by the user. The timing of the display on the GUI can also be independent of the sending of the identifier to the dimensioning engine of the plugin.

At stage 120, the plugin determines a dimensioning rule based on the part identifier. Different parts can have different dimensioning rules. The plugin can use or maintain one or more tables of dimensioning rules. The part identifier can correspond to one or more of these rules. Dimensioning rules can specify which dimensions to measure. This can include indicating where first and second reference points should be located for purposes of displaying dimension. It can also indicate where the dimension value itself should be displayed. The dimensioning rules can also include measurement points for use in calculating the dimensions. For example, even though a dimension is displayed for first and second reference points, based on the structure the actual measurement and calculation can require one or more additional measurement points. The measurement, for example, can be along a projection that is parallel to one aspect of the part.

Part identifiers can also indicate part types, in an example. Different part types can have different relevant dimensional measurements. The part type can dictate which points will be measured and the possible locations for rulers indicating the measurements on the GUI.

At stage 130, the plugin can dynamically select first and second reference points based on the dimensioning rule. These can be used to draw lines indicating where the dimension applies, in an example. This can allow the GUI to more clearly indicate the dimensions for part assemblies that include one or more parts. For the purposes of this disclosure, a single part, such as a pipe or duct, that bends at an angle, can be considered two parts that intersect at the bend point or at an imaginary point needed to construct the bend. The first and second reference points can help distinguish what dimension is being measured.

At stage 140, the plugin can calculate a dimension for the first and second reference points. This can include using a measuring point to calculate the dimension. For example, when the first reference point is on a first part of a tee and the second reference point is on a second part of the tee, the dimensioning engine can pick a third point (i.e., measuring point) that forms lines parallel with the first and second parts based on the first and second reference points. A measurement from the first or second reference point to the third point can be used as the dimension of the first and second reference points.

Dimensioning rules can pick such measuring points based on how parts bend or intersect with one another in the part assembly. Some dimensions do not require a measuring point and instead can be based on measuring between the reference points.

At stage 150, the computing device can display, on the GUI, the dimension outside a boundary of the part assembly. The boundary can be established based on what portion of the part assembly is visible. The boundary therefore can change for different views of the part assembly. In one example, the boundary is selected based on an outline of the part assembly plus some amount of offset.

The dimensioning rules can also specify circumstances under which particular dimensions will be visible or hidden. For example, the view of the part assembly can directly impact which dimensions are visible and which are hidden. In one example, the plugin can introduce a ruler with a dimensioning measurement at a first location and make an API call to determine whether the ruler is behind the part. If it is, then the ruler can be placed at a second position and so on until the API call indicates that the ruler is not behind the part. In one example, the locations are ordered based on a perspective of the part. The rule can be placed along a parallel line with respect to the line of measurement, in an example.

Figure 2A:
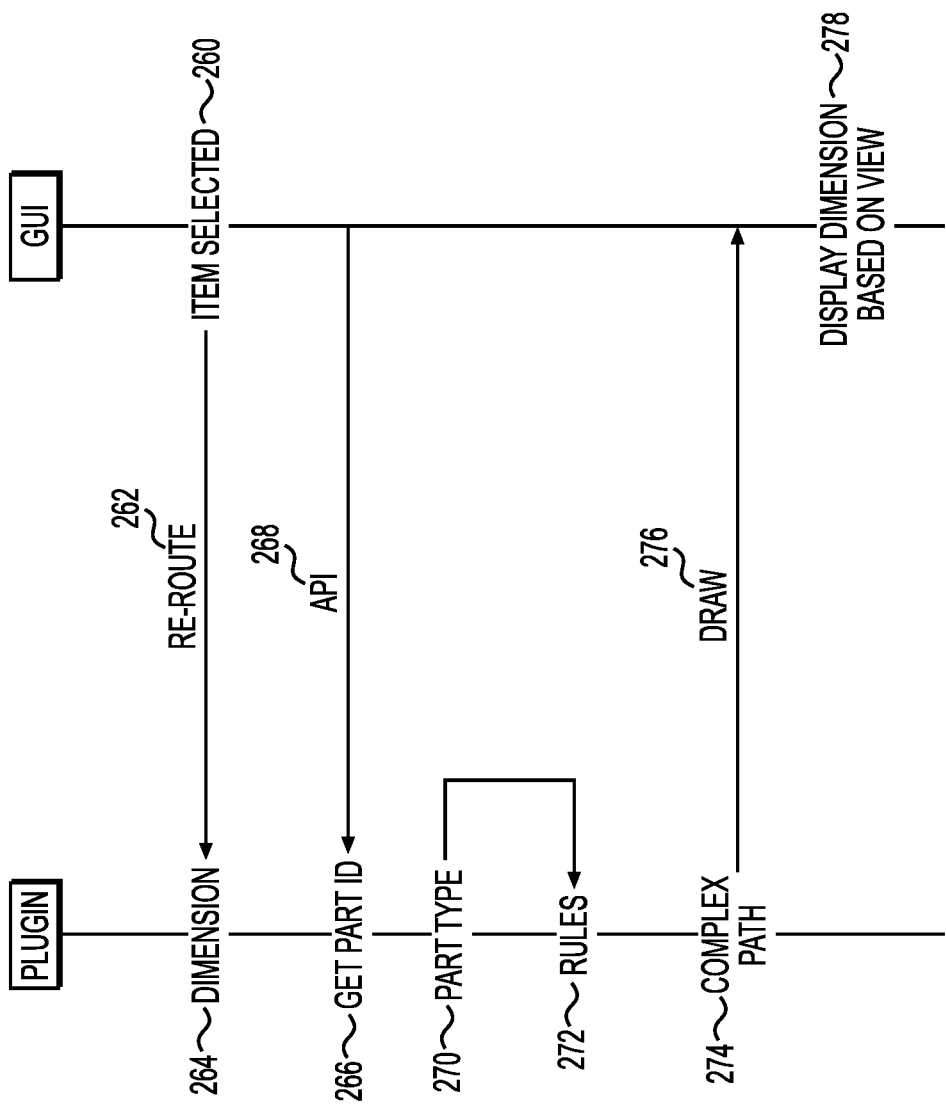
FIG. 2A is an illustration of example sequence diagram for auto-dimensioning.

FIG. 2A is an example sequence diagram for auto-dimensioning. At stage 260, an item can be selected. A BIM application, such as REVIT, can include a menu of different items that are available for placement within the design layout screen of the GUI. The user can select a part (i.e., item) and drag it into the layout, in an example.

The act of selecting an item can cause an implemented method to call the plugin at stage 262. I this way, the item selection can be rerouted to the plugin for auto-dimensioning purposes. In one example, the plugin is only notified if an auto-dimensioning option is selected. In one example, the plugin implements hooks within the REVIT API to ensure that the plugin is notified of the item selection.

At stage 264, the plugin can perform auto-dimensioning on the selected item. In one example, this stage occurs automatically based on the item selection. In another example, it occurs based on a user selection on the GUI, such as an auto-dimensioning button that is generated by the plugin using the REVIT API.

To perform the dimensioning, the plugin can get the part ID for the selected item at stage 266. In one example, this happens as part of the re-re-routing at stage 262. The BIM software can supply the part ID to the plugin as part of the re-routed selection. Alternatively, the plugin can request the part ID by making an API call at stage 268. For example, the user can select an auto-dimension button and the plugin can request part IDs for all selected items. The item IDs can allow the plugin to perform auto-dimensioning for those parts.

At stage 270, the plugin can use the part ID to identify a part type. Different part types can have different dimensioning rules. In one example, a table can correlate part IDs to part types. Another table can correlate part types to rules. Still another table can be used to identify exceptions based on part ID or part type. In one example, particular combinations of a parts in an assembly give rise to exceptions. For example, two ducts connected together with one duct as a tab can cause the measurement to occur on the opposite side of the duct from the tab.

At stage 272, based on the part ID or part type, the plugin can identify applicable dimensioning rules. The rules can vary for different part types, such as pipes versus ducts, based on the measurements needed for ordering parts corresponding to that part type. The rules can determine where to place measurement points on the part. The rules can also specify multiple different measurements for a single part.

In one example, the part can be identified as one of a rectangle duct and round duct. The round versus rectangular distinction can guide whether the measurement point is placed in the center of the pipe or duct versus the outside. For example, a rectangular duct can have measurement points at the edge of the duct (i.e., of the outer wall), whereas a round duct or pipe can have measurement points at the center of the pipe relative to the outer wall.

The rules can also specify a dimensioning style for each measurement, such as linear or aligned. This can allow the plugin to know how to orient the ruler and the slope of what is being dimensioned. With a linear dimensioning style, the measurement can be a projection from a line between two measurement points. For example, the measurement points can form the hypotenuse of a right-angle triangle. The measurement itself can be one of the triangle sides that forms the right angle. With an aligned measurement style, the measurement can be the hypotenuse that connects the two measurement points. The dimensioning style needed for a part can vary but can be determined by the plugin based on the rules for that part ID or part type.

Part shape can guide the dimensioning style and the measurement point locations, in an example. For example, ducts can be classified according to a tee, tab, or turn. In one example, the rules can specify measuring an angle when the part includes a turn. For example, a round duct with a bend can include an angle measurement with a first measurement point in the center of the duct prior to the bend and a second measurement point in the center of the duct after the bend. A part with an intersection, such as a tee, can include multiple measurements. The intersection point can be one of the measurement points. The intersection point can be placed at the outside edge of an intersecting duct for a rectangle duct, but at a center point for a round duct. Additionally, the outside edge can be chosen on a flat side of a tap when another side has a flange.

The rules can also specify an offset amount such that measurements are more likely to not be covered by the part. The offset rule can indicate whether to include lines representing the offset from the measurement point to the graphical line (e.g., ruler) that indicates the measurement.

At stage 274, a complex measurement path can be determined based on the viewing size and viewing angle of the part. The slope itself can be based on the dimensioning style relative to the measurement points, combined with the offset. This can allow the true length (e.g., of the bottom line rather than hypotenuse) to be measured, angled, and sized according to the view angle of the part.

At stage 276, the plugin can cause the GUI to draw the measurements indicated by the rules. The drawing instructions can be based on API calls to the BIM software, in an example. The API calls can indicate start and endpoints for lines and text for measurements, plus angling the text to be parallel or perpendicular to the measurement line.

In one example, the lines can be created as a new REVIT object that is connected to the part. This can allow it to maintain its orientation when view of the part changes. In one example, at stage 278, the plugin GUI can display the rulers at locations that are based on the current view of the part. For example, the plugin can check to see whether the ruler is behind the part, such as by placing API calls to REVIT. If so, the plugin can use another location and make the same check as to whether the location (or the ruler when placed at the location) is partially hidden. Once a location is found that is not hidden, the dimensions can be redrawn at this location at stage 276.

Figure 2B:
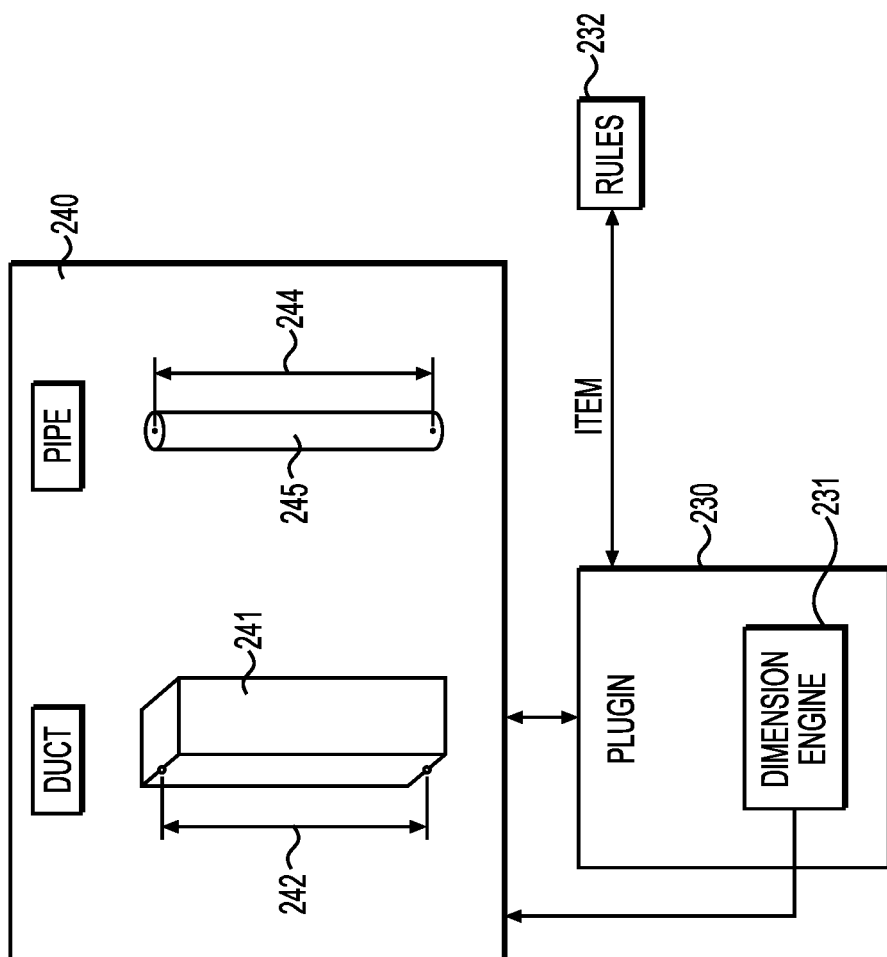
FIG. 2B is an illustration of example system components for auto-dimensioning.

FIG. 2B includes an example illustration of system components. A GUI 240 can include various parts 241, 243 and perform auto-dimensioning to place measurements 242, 244 on the parts 241, 243. When auto-dimensioning is enabled for a selected part 242, 244, the GUI can make a call to a plugin 230 based on hooks in the GUI code that redirect to the plugin 230.

The plugin 230 can be code that runs as an add-on to an existing BIM application with the GUI 240 functionality. Alternatively, the plugin 230 can be built into the BIM application itself. The plugin 230 can include a dimensioning engine 231 with subroutines for determining how to measure the parts 241, 243. In one example, the dimensioning engine 231 can access rules 232, which can be part of the plugin 230 or stored separately as a database, such as on a user device where the GUI 240 operates or in some accessible network location.

The rules can use part IDs for parts 241, 243 to determine part type for each. The part type can then be compared against the rules 232 to determine where to place measurement points (also called "reference points."). For example, the rules 232 can specify whether the reference points are placed at the edge of a part or the center of a part. This can be driven based on industry standards regarding how measurements are supplied to manufacturers as part of the part ordering process. For example, a rectangular duct 241 can be measured from the edge of the duct 241, meaning the reference points are placed at the edge. A circular duct or pipe 243 may be measured from the center of the pipe, meaning the reference points can be placed at the center.

The measurement points can allow calculations of complex slopes based on dimension style. For example, a dimension can be linear, in which case the reference points may not represent the points for measurement. The dimension can also be aligned, in which case a measurement between the two reference points can suffice. In the example of FIG. 2B, both measurements 242, 244. Each measurement is parallel to the reference points, offset in a direction that does not fall behind the respective part 241, 243. The offset amount can be determined by the rules 232 and can be scaled according to the view size of the parts 241, 243 in the GUI 240. The plugin 230 can cause the GUI 240 to draw lines indicating the offset. This can allow the user to understand the measurement points for each measurement 242, 244.

Figure 2C:
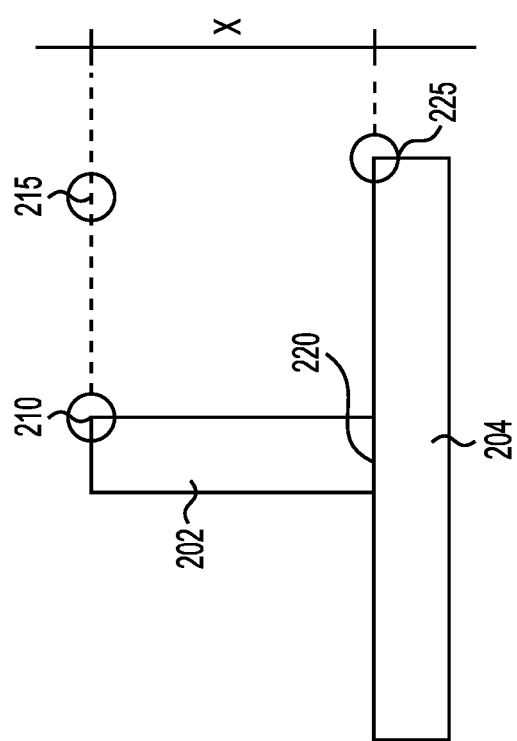
FIG. 2C is an example illustration of dimension measurements for a tee intersection.

FIG. 2C is an example illustration of a GUI that shows a of a tee intersection. A first part 202 intersects with a second part 204 at intersection 220 to form the overall tee assembly of FIG. 2C. The first reference point 210 can be on the first part 202 and the second reference point 225 can be placed on the second part 204. A measurement point can be selected at 215. This can form a parallel line along the measurement dimension (with the second reference point 225) with the first part 202. A line between measurement point 215 and first reference point 210 can be parallel with respect to the second part 204. This can allow the dimension X to be calculated in this example as 3'6", even though the aligned measurement between the first and second reference points 210 and 225 would not be 3'6". In another example, the line at 225 is a hypotenuse and the dimension X is calculated based on a triangle side parallel to part 202 with another triangle side being parallel to part 204.

Figure 3:
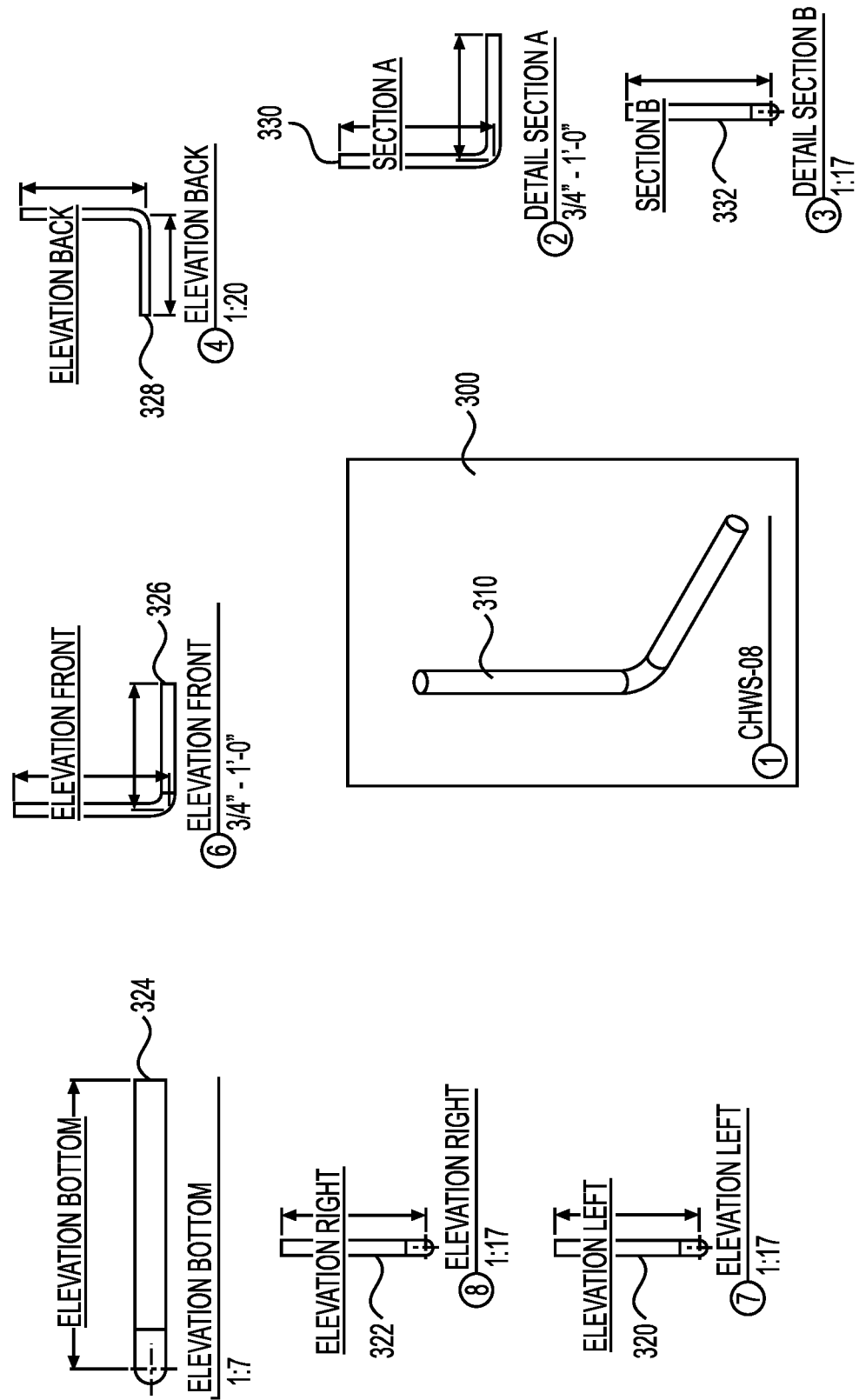
FIG. 3 is an example illustration of multiple views of a part assembly, with dimensions displayed.

FIG. 3 is an example GUI screen showing multiple views of the part assembly 310 in a printable region 300 with various dimensions displayed outside of the printable region 300. This printable region 300 can be a spool sheet for the part assembly, showing parts and welds. The user can run a function that uses the plugin 230 to create the views 320, 322, 324, 326, 328, 330, 332 outside of the printable region 300. Each of these views can be a different elevation, with the dimensions visibly displayed and logically connected to the part assembly 310 of the respective view 320, 322, 324, 326, 328, 330, 332.

The user can prepare the spool sheet 300 by dragging desired views from outside the spool sheet 300 onto the spool sheet 300. This can allow for custom views that may be needed for part ordering or assembly. Each of the views 320, 322, 324, 326, 328, 330, 332 can be automatically drawn at locations outside of the spool screen 300 by the plugin based on a spool sheet template, in an example. Dimensions can be displayed differently based on view orientation of the part assembly 310.

Figure 4:
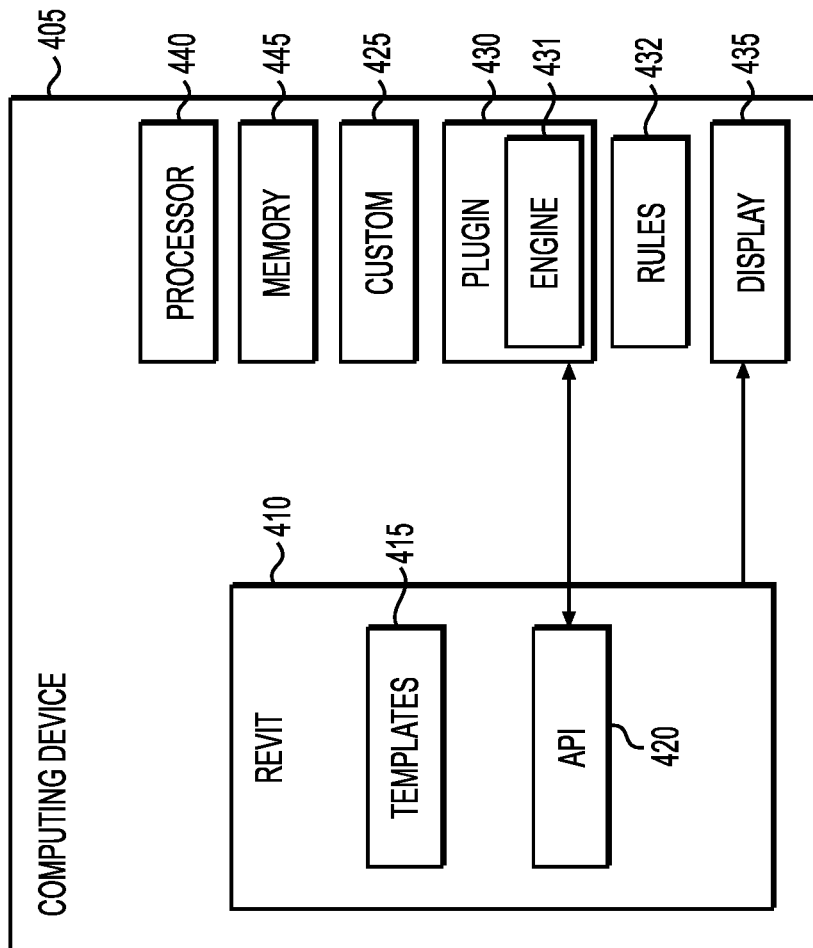
FIG. 4 is an example illustration of system components.

FIG. 4 is an illustration of example system components. The computing device 405 can be any processor-based device, such as a personal computer, workstation, server, phone, tablet, or laptop. The computing device 405 can include a processor 440 and memory 445. The processor 440 can be one or more physical processors that are local to the computing device 405 or virtual computer processing units that are accessed remotely. The memory 445 can be non-transitory and can store instructions for execution by the processor 445.

The processor 440 can run a CAD or BIM application, such as REVIT 410. REVIT 410 can include templates 415 for parts and part assemblies. These can be generic parts and assemblies. Alternatively, custom parts and assemblies 425 can be utilized.

REVIT 440 can also generate a GUI 240 for use with a display 435. The display 435 can be any type of screen and can be integrated into the computing device 405 or separate from the computing device 405.

REVIT 440 can utilize the plugin 430 to add functionality. The plugin 430 can make API 420 calls to REVIT to integrate itself within the workflow. This can include altering the GUI 240 and providing additional functional items, such as menu items and buttons, for use with the auto-dimensioning. The plugin 430 can receive information, such as part identifiers, from REVIT 410, and send back dimensional information. The plugin 430 can also create a spool sheet, such as discussed with regard to FIG. 3, in an example.

In one example, the plugin 430 accesses dimensioning rules 432 to determine which dimensions to display and how to calculate them. The dimensioning rules 432 can be keyed to part or assembly identifiers in an example. A database, either local or remote from the computing device 405, can store the dimensioning rules 432 and be accessed by the plugin 430. The rules 432 can be stored in the memory 445 in an example.

In one example, a dimensioning engine 431 can perform the various stages performed by the plugin 430. The dimensioning engine 431 can interpret the dimensioning rules 432, measure dimensions, and create a spool sheet with views of the part assembly and various dimensions shown. In one example, the dimensioning engine 431 requests the part ID for a selected part (or assembly) and uses that to look up a part type in a table. The part type can then be used to retrieve applicable rules. Rules can be nuanced based on a combination of features of each part type. For example, a round pipe with a bend can receive different measurements than a rectangular duct with a tee. The dimensioning engine 431 can make the measurements and add visible measurements as a connected part to the selected part or assembly. This can cause the dimensions to travel with the part if the user moves the part around the screen or rotates the view of the part. When the view changes, the plugin 430 can be notified. The engine 431 can check whether the measurements are still visible in the new view by determining if the part is in front of the measurements with API calls to, for example, REVIT. If so, the engine 431 can move the measurements to the other side or change offsets so that they remain predominantly visible, in an example.

Although a plugin is described in some examples, the computer-aided application, such as REVIT, can alternatively build the described functionality directly into the application. The examples can still apply to that scenario as well. Additionally, though REVIT is referred to for convenience, the examples can also function with any other computer-aided design application.

Other examples of the invention will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the invention being indicated by the following claims.

What is claimed is:

1. A method for dynamic auto-dimensioning for REVIT, comprising:

receiving, at a dimensioning engine, an identifier of a part assembly, wherein the part assembly is displayed on a graphical user interface ("GUI");

determining a dimensioning rule based on the part identifier, wherein determining the dimensioning rule includes determining a duct type from at least a round duct and rectangular duct, wherein different dimensioning rules apply to the different duct types;

dynamically selecting first and second reference points based on the dimensioning rule;

calculating a dimension represented by the first and second reference points, wherein the calculating includes measuring a distance different than the distance between the first and second reference points; and displaying, on the GUI, the dimension outside a boundary of the part assembly.

2. The method of claim 1, wherein determining the dimensioning rule includes determining an intersection type for two parts in the part assembly, wherein the intersection type includes at least one of a tee, a tab, and a turn, and wherein different dimensioning rules correspond to the intersection types.

3. The method of claim 1, wherein the displaying includes generating a template that includes multiple views of the part assembly, wherein the dimension is displayed differently for two of the views based on orientation of the part assembly.

4. The method of claim 1, wherein the assembly includes a tee intersection for first and second parts, wherein dimension is calculated based on a measurement to a measurement point that is placed based such a line between the first reference point and measurement point is parallel to the second part and a line between the second reference point and the measurement point is parallel to the first part.

5. The method of claim 1, wherein the dimensioning rule is selected from a table of dimensioning rules, and wherein the table includes exceptions for particular part combinations.

6. The method of claim 1, further comprising determining which of a plurality of dimensions are visible, wherein displaying the dimension is based on the dimension being determined to be visible.

7. A non-transitory, computer-readable medium containing instructions for dynamic auto-dimensioning for computer-aided design, wherein a processor executes the instructions to perform stages comprising:
receiving, at a dimensioning engine, an identifier of a part assembly, wherein the part assembly is displayed on a graphical user interface ("GUI");
determining a dimensioning rule based on the part identifier, wherein determining the dimensioning rule includes determining a duct type from at least a round duct and rectangular duct, wherein different dimensioning rules apply to the different duct types;
dynamically selecting first and second reference points based on the dimensioning rule;
calculating a dimension represented by the first and second reference points, wherein the calculating includes measuring a distance different than the distance between the first and second reference points; and
displaying, on the GUI, the dimension outside a boundary of the part assembly.

8. The non-transitory, computer-readable medium of claim 7, wherein determining the dimensioning rule includes determining an intersection type for two parts in the part assembly, wherein the intersection type includes at least one of a tee, a tab, and a turn, and wherein different dimensioning rules correspond to the intersection types.

9. The non-transitory, computer-readable medium of claim 7, wherein the displaying includes generating a template that includes multiple views of the part assembly, wherein the dimension is displayed differently for two of the views based on orientation of the part assembly.

10. The non-transitory, computer-readable medium of claim 7, wherein the assembly includes a tee intersection for first and second parts, wherein dimension is calculated based on a measurement to a measurement point that is placed based such a line between the first reference point and measurement point is parallel to the second part and a line between the second reference point and the measurement point is parallel to the first part.

11. The non-transitory, computer-readable medium of claim 7, wherein the dimensioning rule is selected from a table of dimensioning rules, and wherein the table includes exceptions for particular part combinations.

12. The non-transitory, computer-readable medium of claim 7, the stages further comprising determining which of a plurality of dimensions are visible, wherein displaying the dimension is based on the dimension being determined to be visible.

13. A system for dynamic auto-dimensioning for computer-aided design, comprising:
a processor that executes instructions for running a design application having an application programming interface ("API");
a memory that includes code for a plugin, the plugin interacting with the API to cause the processor to perform stages comprising:
receiving, at a dimensioning engine, an identifier of a part assembly, wherein the part assembly is displayed on a graphical user interface ("GUI");
determining a dimensioning rule based on the part identifier, wherein determining the dimensioning rule includes determining a duct type from at least a round duct and rectangular duct, wherein different dimensioning rules apply to the different duct types;
dynamically selecting first and second reference points based on the dimensioning rule;
calculating a dimension represented by the first and second reference points, wherein the calculating includes measuring a distance different than the distance between the first and second reference points; and
displaying, on the GUI, the dimension outside a boundary of the part assembly.

14. The system of claim 13, wherein determining the dimensioning rule includes determining an intersection type for two parts in the part assembly, wherein the intersection type includes at least one of a tee, a tab, and a turn, and wherein different dimensioning rules correspond to the intersection types.

15. The system of claim 13, wherein the displaying includes generating a template that includes multiple views of the part assembly, wherein the dimension is displayed differently for two of the views based on orientation of the part assembly.

16. The system of claim 13, wherein the assembly includes a tee intersection for first and second parts, wherein dimension is calculated based on a measurement to a measurement point that is placed based such a line between the first reference point and measurement point is parallel to the second part and a line between the second reference point and the measurement point is parallel to the first part.

17. The system of claim 13, the stages further comprising determining which of a plurality of dimensions are visible, wherein displaying the dimension is based on the dimension being determined to be visible.

* * * * *